United States Patent [19]

Ugon

[11] Patent Number: 4,656,342
[45] Date of Patent: Apr. 7, 1987

[54] METHOD AND APPARATUS FOR AUTHORIZING THE HOLDER OF A PORTABLE OBJECT SUCH AS A CARD TO GAIN ACCESS TO AT LEAST ONE SERVICE PROVIDED BY AT LEAST ONE AUTHORIZING ENTITY

[75] Inventor: Michel Ugon, Maurepas, France

[73] Assignee: Cii Honeywell Bull(Societe Anonyme), Paris, France

[21] Appl. No.: 820,586

[22] Filed: Jan. 21, 1986

Related U.S. Application Data

[63] Continuation of Ser. No. 572,080, Jan. 19, 1984, abandoned.

[30] Foreign Application Priority Data

Jan. 20, 1983 [FR] France .................. 83 00884

[51] Int. Cl.⁴ .............................. G06F 15/30
[52] U.S. Cl. ...................... 235/379; 235/380; 235/492
[58] Field of Search .............. 235/379, 380, 492

[56] References Cited

U.S. PATENT DOCUMENTS

| | | | |
|---|---|---|---|
| 3,806,874 | 4/1974 | Ehrat . | |
| 4,001,550 | 1/1977 | Schatz . | |
| 4,211,919 | 7/1980 | Ugon | 235/487 |
| 4,224,666 | 9/1980 | Giraud | 364/200 |
| 4,264,912 | 4/1981 | Coburn et al. | 346/161 |
| 4,271,482 | 6/1981 | Giraud | 364/900 |
| 4,295,039 | 10/1981 | Stuckert | 235/492 X |
| 4,295,041 | 10/1981 | Ugon | 234/487 |
| 4,310,897 | 1/1982 | Lazzari . | |
| 4,328,414 | 5/1982 | Atalla | 235/380 |
| 4,453,074 | 6/1984 | Weinstein | 235/380 |
| 4,471,216 | 9/1984 | Herve | 235/380 |
| 4,498,000 | 2/1985 | Decavele et al. | 235/379 X |

FOREIGN PATENT DOCUMENTS 0057603 8/1982 European Pat. Off. .
0058029 8/1982 European Pat. Off. .
2503423 10/1982 France .

Primary Examiner—David L. Trafton
Attorney, Agent, or Firm—Kerkam, Stowell, Kondracki & Clarke

[57] ABSTRACT

The invention relates to a method and an apparatus for authorizing the holder of a portable object such as a card to gain access with this card to at least one service provided by at least one authorizing entity. According to the invention, the method enables the holder of a card C to become authorized to have access to a particular service by causing an authorizing datum to be written on his card C by an authorizing system T, causing the calculation by both the card C and the system of a result taking into account at least one secret datum S, comparing in a comparator CC of the card the results calculated, and validating the authorizing datum if the results are identical.

15 Claims, 4 Drawing Figures

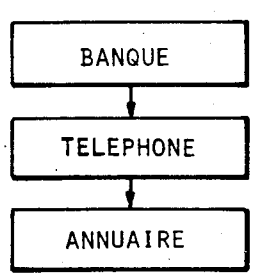
FIG.1a
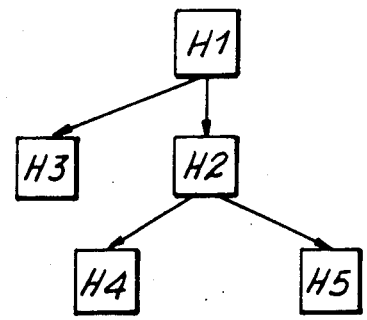
FIG.1b
FIG.3
|  | ZA | ZB | ZM | ZK | ZD |  |
|---|---|---|---|---|---|---|
| a1 | 1 | 1 |  | BANQUE | DATA | HK1 |
| a2 | 1 | 1 | BANQUE | TELEPHONE | DATA | HK2 |
| a3 | 1 | 1 | TELEPHONE | ANNUAIRE | DATA | HK3 |
|  | ZA | ZB | ZK | ZD |  |
|---|---|---|---|---|---|
| a10 | 1 | 1 | BANQUE | 1000 | M01 |
| a20 | 1 | 1 | TELEPHONE | DATA | M02 |
| a30 | 1 | 1 | ANNUAIRE | DATA | M03 |
| an | 1 | 1 | BANQUE | 5000 | M010 |

METHOD AND APPARATUS FOR AUTHORIZING THE HOLDER OF A PORTABLE OBJECT SUCH AS A CARD TO GAIN ACCESS TO AT LEAST ONE SERVICE PROVIDED BY AT LEAST ONE AUTHORIZING ENTITY

This is a continuation of application Ser. No. 572,080, filed Jan. 19, 1984, now abandoned.

FIELD OF THE INVENTION

The invention relates generally to the problems presented by the use of a portable object to gain access to services protected by confidentiality. More particularly, it is the object of the invention to provide a method and an apparatus for authorizing the holder of a portable object such as a card to gain access with this card to at least one service provided by an authorizing entity.

BACKGROUND OF THE INVENTION

The development of computer communications has demonstrated a novel problem, i.e., how to be recognized, whether at a distance or not, by a correspondent who does not know us personally or by a data processing system with which one wishes to communicate, from a terminal, for example.

This development has assumed concrete form in the appearance of portable and non-portable electronic carriers, such as cards including a non-volatile, protected memory, which suggest numerous applications, especially intended for the general public. Reference may be made to U.S. Pat. Nos. 4,211,919; 4,264,912 and 4,310,897 for typical portable data carriers. Other forms of such devices are, of course, also known.

Thanks to the personalizing of these cards by data prerecorded in their memories, it has been possible to conceive of and put into practice systems enabling the authorization of persons or entities to perform protected operations specific to the intended applications.

All these applications give rise to an exchange of information in the form of a dialogue between at least one card and one terminal. From the moment where an exchange of information takes place, particularly of confidential information, it is imperative to implement controls charged essentially with verifying the validity of the information exchanged. This is all the more imperative because the idea of fraud must necessarily be associated with the idea of protected access or of a protected service.

Systems are already in existence in which a card enables access to protected fields. See, for example, U.S. Pat. Nos. 4,211,919; 4,224,666; 4,271,482 and 4,295,041. To improve the resistance to fraud on the part of these systems, a dialogue has been instituted which takes into account randomly selected passwords in such a way as to prevent a defrauder from reproducing a sequence of previous dialoge and gaining illicit access to the protected field. Such a system is described in particular in U.S. Pat. No. 4,471,261, the subject matter of which is hereby incorporated by reference.

Other systems allow a card to be used for financial applications. At the outset the card must be credited with a certain sum of money by a duly authorized issuing entity. To prevent attempted fraud, especially by modifying the amount credited on the card, the issuing entity protects itself by using a password to safeguard the control of the operations. An improvement has been made in these systems to enhance resistance to fraud, by using a specific password the value of which is correlated with a datum specific to the card by way of algorithm known solely to the issuing entity.

After being used several times, the credit on the card is used up and its holder must have a new credit inscribed on it. At the present time there are only two possible ways to recredit a card: Either the card is purely and simply no longer usable, and a new card must be reissued; or one must have the card recredited by the issuing entity solely authorized to perform such an operation. In both cases, the holder of the card must accordingly travel to the location of the issuing entity.

Thus far the cardholder has not able to have this card recredited at a distance, and in particular from his home. In fact, such an operation would necessitate the transmission of confidential information on the communication line connecting a terminal located in the home of the card holder with a system located at the issuing entity. This confidential information essentially comprises a customer key to permit the transaction equipment of the entity to certify the legitimacy of the card holder and furthermore a key specific to the entity transmitted to the card to enable the card to certify that it is indeed in communication with the terminal of the authorizing entity. From the moment that there is communication of confidential information, the possibility of fraud exists.

OBJECT AND SUMMARY OF THE INVENTION

The present invention has the object of overcoming this disadvantage, by permitting the specific holder of a card to recredit his card from his home by suppressing the transmission of the confidential keys specific to a given application. This suppression makes it possible to envision the use of one and the same card to gain access to services shared simultaneously amoung a plurality of authorizing entities. This problem cannot be resolved by using a unique password, because that would permit the interpretation of information proper to different services from the card memory and its simulation by a defrauder.

Thus by eliminating the idea of the password specific to a particular service and substituting for it an exchange of random information interpreted directly by the card, the invention makes it possible for the card to function under self-management and to validate the various results of calculations performed on behalf of the various entities.

To this end, the invention proposes a method for authorizing the holder of a portable object, such as a card, to gain access with this card to at least one service provided by at least one authorizing entity, in general comprising the connection of the card to an authorizing system proper to that authorizing entity, causing an authorizing datum to be written by this system upon the demand of the card holder into a memory of the card in order to gain access to this service, causing the card and the system to calculate a result (R) produced by the execution of one and the same program (P) taking into account at least one secret datum (S) prerecorded in both the card and the system, the method being characterized in that it comprises the comparison in the card of the results (R) calculated beforehand, and the validation by the card of the authorizing information if this comparison satisfies a predetermined condition.

Other advantages, characteristics and details of the invention will become apparent from the ensuing description, taken in conjunction with the drawings which show one preferred exemplary embodiment of the invention.

BRIEF DESCRIPTION OF THE DRAWINGS

FIGS. 1a and 1b schematically illustrate the connections that can exist between different authorizing entities to which the card holder can gain access;

FIG. 3 explains the nature of the authorizing information written in the memory of the card and identifying the corresponding authorizing entities.

DESCRIPTION OF THE PREFERRED EMBODIMENT

Figure 2:
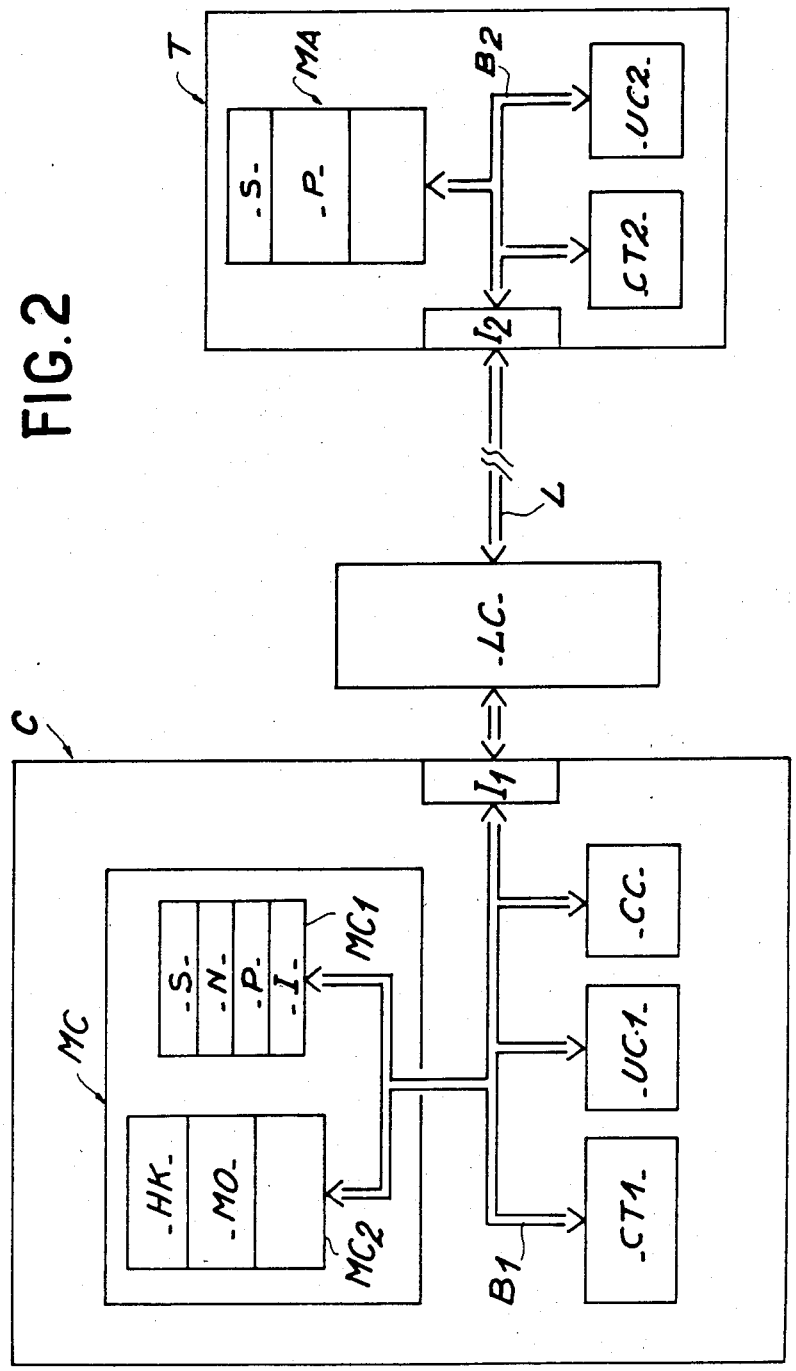
FIG. 2 is a block diagram showing the means required for performing the method according to the invention.

Before the method according to the invention is described, it should first be explained what is to be understood by the term "authorizing entity". An authorizing entity is an entity, generally recognized officially, which provides at least one service to which any person, whether a natural person or an artificial one, can gain access by using a card issued by that entity.

Referring now to FIG. 1a, an authorizing entity BANQUE, such as a banking establishment authorized to issue credit cards, is shown schematically. A person having in his possession a credit card of this kind can approach another authorizing entity (H1 in FIG. 1b) to obtain services provided by it, and if possible using the card already issued to him by the authorizing entity BANQUE. A multi-service card thereby arises.

It is equally possible to link the authorizing entities to one another in a chain to make them dependent on each other, as shown in FIGS. 1a and 1b. The authorizing entity BANQUE, or principal authorizing entity, can give access to an authorizing entity TELEPHONE, which in turn gives access to an authorizing entity ANNUAIRE ("directory"). Under these conditions, a person cannot obtain the service provided by the entity ANNUAIRE unless he already possesses the entity TELEPHONE, and in order to have the entity TELEPHONE he must already possess the entity BANQUE.

In this example, the authorizing entity TELEPHONE authorizes the use of telephone booths receiving the cards in order to assure automatically that call units are accounted, and the authorizing entity ANNUAIRE permits telephone directories to be consulted on a screen from the card holder's home.

FIG. 1b shows a more general example of a possible treeing among a plurality of authorizing entities. The authorizing entity H1 or principal authorizing entity permits access to the authorizing entities H2 or H3, and the authorizing entity H2 permits access to the authorizing entities H4 or H5. Thus a person desiring access to the authorizing entity H5 must necessarily already have access to the authorizing entities H2 and H1.

Turning to FIG. 2, a portable object such as a card (C) is assumed to be shown. This card (C) includes at least one memory MC, processing circuits CT1, a comparison circuit CC and a command unit UC1. (A typical card is shown in U.S. Pat. No. 4,211,919, which is hereby incorporated by reference).

All these elements communicate with one another via a linking bus B1.

The memory MC is divided into at least two memory zones MC1; MC2. Recorded in memory zones MC1 are at least one secret datum S unknown to the card holder, one number N proper to the card and one algorithm for a particular calculation, translated by a program (P).

Recorded in memory zone MC2 are at least authorizing words HK associated with opening words MO and intended for receiving information identifying the authorizing entities and information relating to data specific to the services provided by these authorizing entities.

A typical authorizing system is shown in U.S. Pat. No. 4,211,919, which is hereby incorporated by reference.

An authorizing system T specific to a particular application includes at least the following:

one memory MA where the same secret information S and the above-mentioned program P are recorded;

processing circuits CT2, in particular for executing the program P;

and a command unit UC2 for synchronizing the exchanges of information between the card C and the system T. All these elements are connected with one another via a linking bus B2.

To converse with the system T, the card C is connectable to a card reader LC via an interface $I_1$. This card reader LC is connected by a channel of communication L with the system T via an interface $I_2$. A typical card reader is shown in U.S. Pat. Nos. 4,443,049 and 4,449,775, the subject matter of which is hereby incorporated by reference.

By way of example, the card reader LC is located in the home of the individual card holder; the communication channel I is for example assured via a telephone line; and the system T is located on the premises of the authorizing entity for furnishing a particular service.

For the holder of a card C to gain access to the service provided by an authorizing entity, this card C must contain an authorizing word HK proper to this authorizing entity.

An authorizing word HK for a principal authorizing entity contains at least one zone ZK which identifies the authorizing entity and complementary zones ZA, ZB, ZD, whose role will be explained further below.

In the case of chaining among different authorizing entities, the authorizing word HK for each authorizing entity dependent on an authorizing entity written preceding it contains in addition a zone ZM which contains the same information as the zone ZK for the authorizing entity written preceding it.

Associated with the authorizing word HK corresponding to each authorizing entity is at least one opening word MO written in the memory of the card C. This opening word MO contains information, in particular information specific to the service provided by the authorizing entity. An opening word MO comprises a zone ZK which identifies the authorizing entity and which thus corresponds to the zone ZK of the associated authorizing word HK, the zone ZD of data proper to the service provided by the authorizing entity, and complementary zones ZA, ZB identical to those of the associated authorizing word HK.

Let it be assumed that a person, either natural or artificial, wishes to avail himself of the service provided by a principal authorizing entity, that is, one which is not dependent on some other authorizing entity. Taking the case of FIG. 1a as an example, this principal authorizing entity is the entity BANQUE.

The person goes to this authorizing entity, such as a banking establishment in particular authorized to issue credit cards. After preliminary, standard controls bearing upon the identity of the person, for example, and the condition of his bank account or after such account has been opened, the authorizing entity BANQUE issues a credit card, in the memory zone MC2 of which an authorizing word HK1 has been written at the address a1 (see FIG. 3) and an opening word MO1 has been written at the address a10. These writing operations are performed on the premises of the banking establishment using a duly protected information processing system used for authorizing and to which a card C is connected.

Referring to FIG. 3, the zones ZK, ZD, ZA, ZB are filled as follows:
zone ZK contains the information BANQUE;
zone ZD contains security data;
zone ZA may simply comprise a single binary bit taking the value "1"; and
zone ZB may likewise comprise a single binary bit taking the value "1".

The zones ZK, ZD, ZA, ZB of the opening word MO1 are filled as follows:
zone ZK contains the information BANQUE;
zone ZD contains a credit in the amount of 1,000 dollars, for example;
and zones ZA, ZB contain the same information as zones ZA, ZD of the associated authorizing word HK1.

Also recorded in the memory zone MCL of the card C are the parameters S, N, P, defined above, as well as code I known to the card holder to enable subsequent certification via the card, in a known manner, of the legitimacy of the holder of this card prior to the execution of any operation.

The person provided with such a card C may then find himself in one of three situations.

The first, or normal, situation corresponds to the case where the card holder utilizes it to perform banking transactions authorized by the authorizing entity BANQUE, and upon each transaction the credit inscribed in zone ZD of the opening word MO1 is debited with the amount of the transaction. The system charged with writing the new credit amount seaches in the memory zone MC2 of the card C for an opening word whose zone ZK contains the authorizing entity BANQUE and, before writing, verifies that the bits in the zones ZA, ZB are indeed at the value "1".

The second situation arises when the amount of credit inscribed in the card is insufficient to envision new transactions. Heretofore the card holder had no other option than to go to the authorizing entity BANQUE to have his card recredited, or to have a new card issued to him by the process described earlier.

By contrast, according to the invention the holder of a card can recredit it without going to the authorizing entity BANQUE, by performing an operation from his home along the lines of FIG. 2. To do this, he introduces his card C into the card reader LC and then by telephone calls an operator of the authorizing system T located on the premises of the authorizing entity BANQUE. Once the link is established and the card reader LC is connected to the system T, the following operations take place in succession:

The card holder asks the operator to write a new opening word MO10 into the memory zone MC2 of the card C with the following information: The authorizing entity is the entity BANQUE (zone ZK) and the card holder desires credit in the amount of 5,000 (zone ZD). The operator orders the authorizing system T to write this opening word MO10, after having looked for an available address (an) in the memory zone MC2.

The system T or the card C then requests the execution of the program P by the system T and by the card C. This program P takes into account four parameters: the address (an); the secret data S; the authorizing word HK1 of the authorizing entity BANQUE, a word which must normally already have been written on the card; and the datum N proper to the card and comprising a manufacturer's serial number, for example, transmitted to the system T.

The card C, before executing the program P, verifies that it does indeed contain the authorizing word HK of the authorizing entity contained in zone ZK of the opening word MO10 which is now to be written. In this example, the card then checks whether it does contain the authorizing word HK1 of the authorizing entity BANQUE. If the card C does not find the authorizing word HK1, the dialogue stops and the card C invalidates the opening word MO10 by placing the bit "0" in zone ZB of the opening word MO10. By contrast, if the card does find the authorizing word HK1, that is, if it finds the information BANQUE in zone ZK of an authorizing word HK, and also after having verified that the bits in zones ZA, ZB of this word do indeed have the value "1", the card "C" executes the program (P) via its processing circuits CT1.

For its part, the system T also executes the program P; the authorizing word HK1 necessary for this calculation, and which may be known by the operator of the system T, is entered under the control of the system T but is not transmitted by the card C.

The result R calculated by the system T is then transmitted to the card C, which in its comparison circuit CC compares this result R with that which the card itself has calculated.

If the two results satisfy a predetermined condition (for instance, that the two results be equal), the card C validates the opening word MO10 by placing the bit in zone ZB of this word at the value "1". It is important here to note that it is the card itself which validates an opening word. Then, the system T verifies that the contents of the opening word MO10 do indeed correspond to the contents of the word it has caused to be written and it then places the bit in zone ZA of the opening word MO10 at the value "1".

If all these operations proceed normally, the card is in fact credited.

The third situation concerns the case where the holder of the card C wishes to have a new authorizing entity HK written in.

If this authorizing entity is a new principal entity, the procedure is as already described above. On the other hand, if this new authorizing entity is dependent on another authorizing entity whose authorizing word has already been written on the card, the holder of this card can trigger the operation of writing in this new authorizing entity himself along the lines shown in FIG. 2.

Once the link has been established with the system T, the card holder orders the writing of an authorizing word HK. Let it be assumed that the situation is as shown in FIG. 1a, where the card holder wishes access to the authorizing entity TELEPHONE HK2. He then asks the terminal T for an authorizing word HK2 with the information "TELEPHONE" in zone ZK and the information "BANQUE" in zone ZM. Once the authorizing word HK2 is written, for instance at the address a2 of the memory zone MC2 of the card C, the card then verifies whether it already possesses an authorizing word HK1 corresponding to the authorizing entity BANQUE. To do so, it looks in the zones ZK of the authorizing words that have already been written for whether one of these zones contains the information "BANQUE". If it does not find this information, the dialogue is broken off. If it does find this information, it then additionally verifies whether the bits of zones ZA, ZB of the authorizing word that has been found are placed at the value "1". If so, then the card C and the system T execute the above-described program with a validation of the authorizing word HK2 under the same conditions as those imposed for writing an opening word MO as described in the preceding situation.

It should be noted that the security information mentioned above and present within zone ZD of each authorizing word HK are intended solely to complicate the process of calculating the result R and thus to prevent a defrauder from being able with ease to precalculate such a result R in advance. This information may for instance include the date on which the authorizing entity was written on the card. To further enhance the security of the system, it is possible to combine the address parameter (a) and the parameter (N) in accordance with a predetermined relationship.

Once the authorizing word HK2 has been validated, the card holder causes an opening word MO2 to be written at an address a20 by the same proocess as has already been described above for writing in the opening word MO10.

It should also be noted that zones ZA, ZB mentioned above are not accessible from the outside.

It is understood that the portable object may be something other than a card and that the authorizing entities in question need not provide financial services exclusively. Such services may relate to magazine subscriptions, films that can be projected on the screen of a customer's television set, and so forth.

What is claimed is:

1. A method of authorizing the holder of a portable card to gain access with the card to services provided by different authorizing entities, each authorizing entity providing a different service, and the card having data storing means, the method comprising preliminarily defining the different authorizing entities to which the holder of the card can gain access to obtain services; chaining the different authorizing entities in a predetermined order of dependency beginning with a first one of the authorizing entities such that each authorizing entity, except said first one, depends in said predetermined order from at least one other authorizing entity; identifying each authorizing entity by an authorizing datum of a predetermined format which includes at least a first datum identifying such authorizing entity and a second datum which identifies the authorizing entity from which such authorizing entity depends in the chained order of dependency; and verifying, upon the holder requesting access to services provided by one of said authorizing entities which were previously unauthorized to the holder, that the authorizing datum of the authorizing entity from which the one requested authorizing entity depends has previously been written in the data storing means of the card.

2. A method as defined by claim 1, wherein the card includes calculating means, and the method further comprises:
connecting the card to an authorizing system of said one requested authorizing entity;
writing by this system, at the order of the card holder, of the authorizing datum of said one requested authorizing entity in the data storing means of the card;
calculating by the card and by the system of a result (R) proceeding from the execution by both of the same program, taking into account at least one secret datum (S) prerecorded in both the card and the system; comparing in the card the results (R) calculated by the card and by the system; and validating by the card of the authorizing datum if the comparison satisfies a predetermined condition.

3. A method as defined by claim 1, comprising writing the authorizing datum of the first authorizing entity in the data storing means upon the issuance of the card to its holder, and writing the authorizing datum of the other authorizing entities in the card upon the order of the holder of this card and under the sole control of the card.

4. A method as defined in claim 2, wherein said writing comprises writing the authorizing datum of the authorizing entities other than the first authorizing entity in the card at a distance and with the card coupled to the system by a communication line.

5. A method as defined by claim 2 comprising taking into account, in the calculation of the result (R), the authorizing datum of the authorizing entity from which the requested authorizing entity depends.

6. A method as defined by claim 2, comprising taking into account, in calculating the result (R), an address in the data storing means where the authorizing datum is written.

7. A method as defined by claim 6, comprising taking into account, in calculating the result (R), the above-mentioned address combined with a datum specific to the card.

8. A method as defined by claim 2, wherein said validating comprises validating the writing of an authorizing datum if identity exists between the results (R) calculated by the card and those calculated by the authorizing system.

9. A method as defined by claim 2 comprising:
associating with each authorizing datum specific to one authorizing entity at least one opening word containing at least the first datum identifying the authorizing entity and another datum specific to the service provided by this authorizing entity;
writing a new opening word upon the order of the card holder and via the authorizing system which is specific to the authorizing entity;
determining whether the authorizing entity identified in the opening word has its authorizing datum already written in the card, and
initiating, in response to said determining, the calculation of the results (R).

10. A method as defined in claim 1, comprising writing the authorizing datum of the authorizing entities other than the first authorizing entity in the card while the card is at the home of the card holder.

11. A method as defined in claim 3, comprising writing the authorizing data of the authorizing entities other than the first authorizing entity in the card at a distance with the card coupled to the system by a communication line.

12. A method as defined by claim 1, wherein the card includes calculating means, and the method comprises calculating a result (R) in the card while taking into account, in the calculation of the result (R), the authorizing datum of the authorizing entity from which the requested authorizing entity depends.

13. A method as defined by claim 3, comprising taking into account, in the calculation of the result (R), the authorizing datum of the authorizing entity from which the requested authorizing entity depends.

14. A method as defined by claim 3, comprising taking into account, in calculating the result (R), an address in the data storing means where the authorizing datum is written.

15. A system for authorizing the holder of a portable card access with the card to services provided by different authorizing entities, the different authorizing entities being chained together in a predetermined order of dependency beginning with a first one of the authorizing entities such that to gain access to the services of any particular authorizing entity it is necessary to have access to the services of the authorizing entity from which said particular authorizing entity depends in said predetermined order, the card including first memory means in which are recorded a secret code (S), a program (P) defining a predetermined algorithm, and authorizing data identifying the authorizing entities to which the holder of the card has access to obtain services provided by such authorizing entities; an authorizing system specific to a desired one of said authorizing entities to which the card holder desires access, the authorizing system including second memory means in which are recorded said secret code and said program; means for connecting the card to the authorizing system; means for calculating in both the card and the authorizing system a result (R) by execution of said program and taking into account said secret code and said authorizing data; comparison means in the card for comparing the results calculated by the card and by the authorizing system; and means responsive to the comparing means for writing in the first memory means an authorizing datum which authorizes access to the requested authorizing entity upon the comparison of the results satisfying a predetermined condition.

* * * * *